(12) United States Patent
Lind et al.

(10) Patent No.: US 10,088,978 B2
(45) Date of Patent: Oct. 2, 2018

(54) COUNTRY-SPECIFIC CONTENT RECOMMENDATIONS IN VIEW OF SPARSE COUNTRY DATA

(71) Applicant: Pandora Media, Inc., Oakland, CA (US)

(72) Inventors: Kyle George Lind, Lafayette, CA (US); Eric Kenson Bieschke, San Francisco, CA (US); Gordon Parker Rios, Fort Bragg, CA (US)

(73) Assignee: PANDORA MEDIA, INC., Oakland, CA (US)

( * ) Notice: Subject to any disclaimer, the term of this patent is extended or adjusted under 35 U.S.C. 154(b) by 641 days.

(21) Appl. No.: 14/502,120

(22) Filed: Sep. 30, 2014

(65) Prior Publication Data

US 2016/0092559 A1 Mar. 31, 2016

(51) Int. Cl.
*G06F 3/00* (2006.01)
*G06F 3/0482* (2013.01)
(Continued)

(52) U.S. Cl.
CPC ........ *G06F 3/0482* (2013.01); *G06F 17/3053* (2013.01); *G06F 17/3087* (2013.01);
(Continued)

(58) Field of Classification Search
CPC ......... G06F 17/30752; G06F 17/30772; G06F 17/3053; G06F 3/0482; G06F 17/30867;
(Continued)

(56) References Cited

U.S. PATENT DOCUMENTS 7,075,000 B2 7/2006 Gang et al.
7,102,067 B2 9/2006 Gang et al.
(Continued)

FOREIGN PATENT DOCUMENTS

KR 10-2014-0072446 A 6/2014
WO WO 2005/109356 A1 11/2005

OTHER PUBLICATIONS

PCT International Search Report and Written Opinion for PCT/US2015/052690, dated Jan. 4, 2016, 10 Pages.

*Primary Examiner* — Kieu Vu
*Assistant Examiner* — Asteway T Gattew
(74) *Attorney, Agent, or Firm* — Fenwick & West LLP

(57) ABSTRACT

A content server system provides a user of a client device with a playlist of content, such as streamed audio. The provided playlist is customized for the particular country of the user, even if the content server system has only recently begun to provide content to that country. To customize the playlist for a country lacking a sufficient amount of country-specific statistical data, the content server system generates a number of non-country-specific channels, each channel recommending content according to its own criteria. The content server system generates a non-content specific playlist by combining the channels. The content server system also generates, using the statistics for the country of the user, a country-specific channel that is specific to that country. The content server system generates a country-specific playlist by combining the non-country-specific playlist with the country-specific channel, e.g., according to the amount of country-specific statistics that are available.

17 Claims, 10 Drawing Sheets

(51) Int. Cl.
*G06F 17/30* (2006.01)
*H04L 29/08* (2006.01)
*H04L 29/06* (2006.01)

(52) U.S. Cl.
CPC .. *G06F 17/30752* (2013.01); *G06F 17/30772* (2013.01); *G06F 17/30867* (2013.01); *H04L 65/4084* (2013.01); *H04L 67/18* (2013.01)

(58) Field of Classification Search
CPC . G06F 17/3087; H04L 65/4092; H04L 67/18; H04L 65/4084
See application file for complete search history.

(56) References Cited

U.S. PATENT DOCUMENTS

| | | | | |
|---|---|---|---|---|
| 8,935,279 | B2* | 1/2015 | Skeen | H04L 65/4084 707/754 |
| 9,495,447 | B1* | 11/2016 | Phillips | G06F 17/3074 |
| 2006/0206478 | A1* | 9/2006 | Glaser | G06F 17/30017 |
| 2007/0233743 | A1* | 10/2007 | Rosenberg | G06F 17/30017 |
| 2008/0291197 | A1* | 11/2008 | Nakamura | H04W 4/02 345/418 |
| 2009/0056525 | A1* | 3/2009 | Oppenheimber | G06F 17/30743 84/609 |
| 2012/0110126 | A1* | 5/2012 | Sparks | G06F 17/30029 709/219 |
| 2012/0290648 | A1* | 11/2012 | Sharkey | G06F 17/30053 709/204 |
| 2013/0205223 | A1* | 8/2013 | Gilbert | G06Q 30/0269 715/748 |
| 2014/0162695 | A1 | 6/2014 | Jeon | |
| 2014/0281977 | A1* | 9/2014 | Schupak | G06F 3/04817 715/716 |
| 2014/0281978 | A1* | 9/2014 | Ye | G06F 3/01 715/716 |
| 2016/0034564 | A1* | 2/2016 | Shamma | G06F 17/30268 707/752 |

* cited by examiner

Seed-Related Channels 402

| Channel Name | Description |
|---|---|
| Highest Ranking 404 | Songs user has personally ranked highly (e.g. thumbed up) |
| Collaborative Filtering 406 | Crowd opinion based on user's thumbed up songs |
| Whitelist 408 | Songs for seed artist |
| Genre 414 | Songs in the same genre as the seed |
| Similar content / Sounds Like (Mus. Genm) 416 | Songs with musicological similarities to a seed |

| | |
|---|---|
| Song A 418 | Song A "Highest Ranking" Score 424 |
| Song B 420 | Song B "Highest Ranking" Score 426 |
| Song C 422 | Song C "Highest Ranking" Score 428 |
| ⋮ | ⋮ |

| | |
|---|---|
| Song A 430/418 | Song A "Genre" Score 436 |
| Song D 432 | Song D "Genre" Score 438 |
| Song E 434 | Song E "Genre" Score 440 |
| ⋮ | ⋮ |

*FIG. 4A*

Demographic Channels 470

| Channel Name | Description |
|---|---|
| Age 472 | Songs popular with user's age bracket |
| Gender 474 | Currently popular (new songs) |
| Affluence level 476 | Songs popular with those sharing the user's level of income |
| Education level 478 | Songs popular with those sharing the user's level of education |

| | |
|---|---|
| Song A 480/418 | Song A "Gender" Score 491 |
| Song C 482/422 | Song C "Gender" Score 492 |
| Song F 490/460 | Song F "Gender" Score 493 |
| ⋮ | ⋮ |

*FIG. 4B*

Generic Channels 442

| Channel Name | Description |
|---|---|
| Editor's Picks 444 | Test songs (e.g., "editor's favorites") |
| Current 446 | Currently popular (new songs) |
| Recent 448 | Relatively new popular songs (e.g., songs popular within the last 2 years) |
| Gold 450 | Classic / always popular songs |
| New Release 454 | Newly-released songs |

| | |
|---|---|
| Song A 456 | Song A "Gold" Score 462 |
| Song B 458 | Song A "Gold" Score 464 |
| Song C 460 | Song A "Gold" Score 466 |
| ⋮ | ⋮ |

*FIG. 4C*

Country-Specific Channels 497

| Channel Name | Description |
|---|---|
| United States 496A | Songs popular in the United States |
| Germany 496B | Songs popular in Germany |
| France 496C | Songs popular in France |
| Great Britain 496D | Songs popular in Great Britain |
| China 496E | Songs popular in China |
| Austria 496F | Songs popular in Austria |
| ⋮ | ⋮ |

| | |
|---|---|
| Song A 497A | Song A "Germany" Score 498A |
| Song B 497B | Song B "Germany" Score 498B |
| Song C 497C | Song C "Germany" Score 498C |
| ⋮ | ⋮ |

*FIG. 4D*

COUNTRY-SPECIFIC CONTENT RECOMMENDATIONS IN VIEW OF SPARSE COUNTRY DATA

BACKGROUND

1. Field of Art

The present invention generally relates to the user-specific selection of digital content, and more specifically, to ways of providing content tailored to users of a specific country.

2. Background of the Invention

Services providing digital content, such as music, movies, and the like, may wish to recommend or actively provide content to their users so as to free the users from the need to specify the particular content in which they are interested. Different users have different interests, and hence the content recommended or provided differs among the different users. User interests tend to be influenced by a number of different user attributes, such as the user's age, gender, and the like, and hence the attributes should be taken into account when recommending or providing content. The services may over time learn correlations of the different user attributes with particular items of digital content that are appropriate for those attributes, such as by analyzing statistics on prior content consumption and interaction to observe how users with various attributes react to the content items that have been recommended or provided to them in the past.

The user's country—such as the country of residence or of birth, which are strongly linked to user language and culture, as well as to geographic location—is one attribute that often has a significant influence on the user's interests in content. However, some services providing digital content may only gradually expand the availability of their service to different countries, or begin tracking country-specific content statistics. As a result, the services lack country-specific content statistics, and accordingly lack the ability to provide useful recommendations or content to users of those countries based on the country-specific statistics alone, at least until the considerable amount of time needed to accumulate a sufficient amount of statistics has passed.

SUMMARY

In one embodiment, a computer-implemented method performed by a client device comprises identifying a client device of a user, the client device receiving streamed audio objects and associated with a first country; identifying an input seed associated with the client device; generating a non-country-specific playlist of audio objects based on the user and on the input seed; generating a country-specific channel corresponding to the first country, the country channel comprising audio objects; generating a country-specific playlist of audio objects by combining the non-country specific playlist with the country channel based on a blending factor; and selecting an audio object from the country-specific playlist for transmission to the client device.

In one embodiment, a computer-readable storage medium comprises computer program instructions executable by a processor. The instructions comprise instructions for identifying a client device of a user, the client device receiving streamed audio objects and associated with a first country; instructions for identifying an input seed associated with the client device; instructions for generating a non-country-specific playlist of audio objects based on the user and on the input seed; instructions for generating a country-specific channel corresponding to the first country, the country channel comprising audio objects; instructions for generating a country-specific playlist of audio objects by combining the non-country specific playlist with the country channel based on a blending factor; and instructions for selecting an audio object from the country-specific playlist for transmission to the client device.

In one embodiment, a computer system comprises a processor and computer program instructions executable by the processor. The instructions comprise instructions for identifying a client device of a user, the client device receiving streamed audio objects and associated with a first country; instructions for identifying an input seed associated with the client device; instructions for generating a non-country-specific playlist of audio objects based on the user and on the input seed; instructions for generating a country-specific channel corresponding to the first country, the country channel comprising audio objects; instructions for generating a country-specific playlist of audio objects by combining the non-country specific playlist with the country channel based on a blending factor; and instructions for selecting an audio object from the country-specific playlist for transmission to the client device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 4A-4D illustrate sets of example channels 320 of media content objects, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
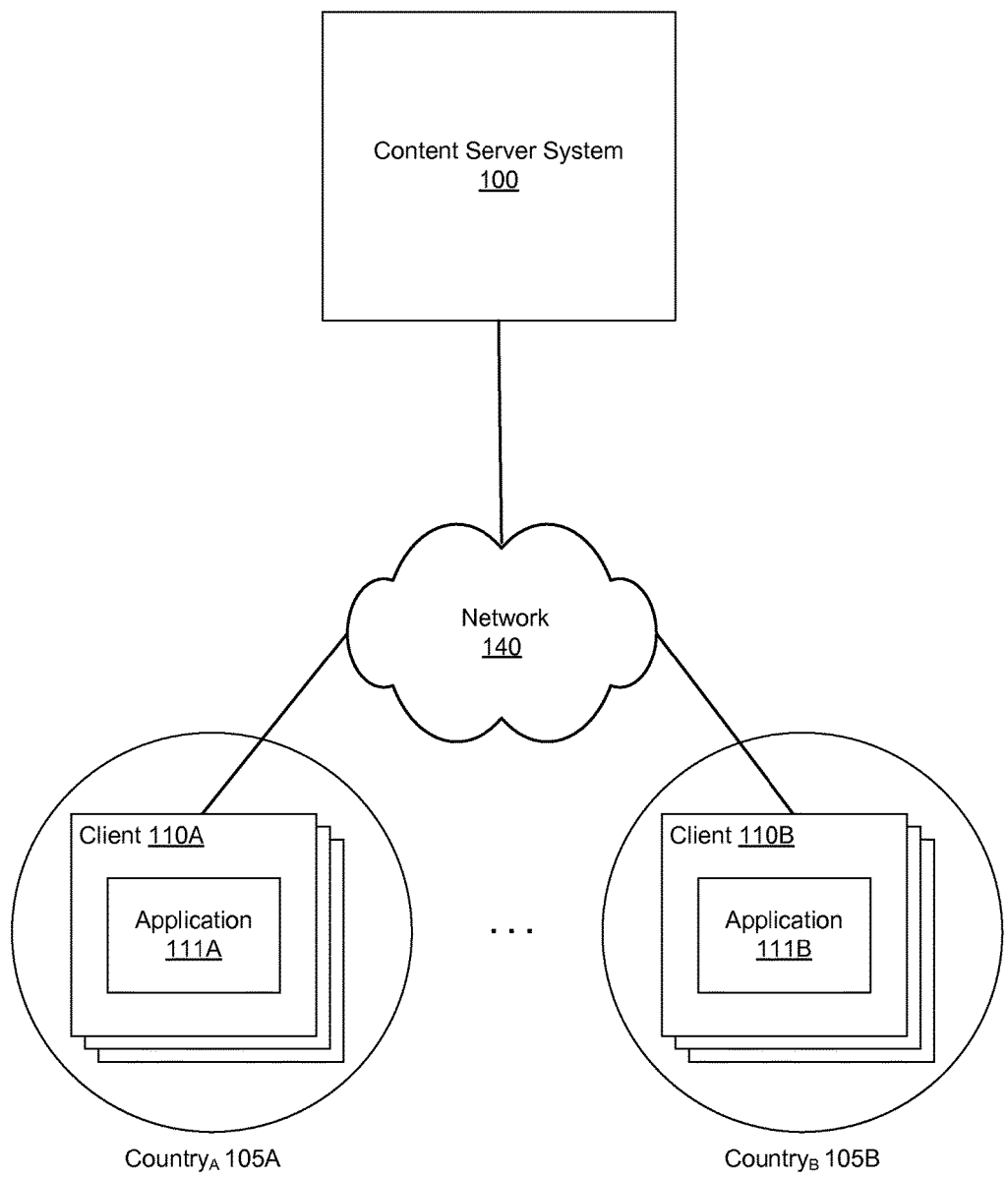
FIG. 1 illustrates a computing environment in which digital content is provided to users, according to one embodiment.

FIG. 1 illustrates a computing environment in which digital content is provided to users, according to one embodiment. A content server system 100 includes the service of providing items of digital content—hereinafter referred to as "media content objects" (or, more succinctly, "content")—to client devices 110.

The content server system 100 and the client devices 110 are connected via a network 140. The network 140 may be any suitable communications network for data transmission. The network 140 uses standard communications technologies and/or protocols and can include the Internet. In another embodiment, the network 140 includes custom and/or dedicated data communications technologies.

In one particular embodiment referred to throughout the remainder of the specification, the content server system 100 provides streamed audio objects, such as songs, pieces of music, or audio recordings. It is appreciated, however, that in other embodiments the content server system 100 could alternatively and/or additionally provide other forms of digital content, such as videos, movies, slideshows, images, or non-streamed audio. Thus, subsequent uses of audio-related terminology could equally apply to (for example) viewing videos or otherwise experiencing media provided by the content server system 100 in other embodiments.

The client devices 110 are computing devices such as smartphones with an operating system such as ANDROID or APPLE IOS, tablet computers, laptop computers, desktop computers, electronic stereos in automobiles or other vehicles, or any other type of network-enabled device on which media content objects may be listened to or otherwise experienced. Typical client devices 110 include the hardware and software needed to input and output sound and images (e.g., speakers and microphone), connect to an electronic network (e.g., via Wifi and/or 4G or other wireless telecommunication standards), and/or determine the current geographic location of the client devices (e.g., a Global Positioning System (GPS) unit).

The various client devices 110 to which content if provided may be located in different countries, with the content server system 100 having provided content to the different countries for different lengths of time. For example, illustrated in FIG. 1 are a set of client devices 110A located in one country (Country$_A$ 105A), in which the content server system 100 has a long history of providing content, and another set of client devices 110B located in a different country (Country$_B$ 105B), in which the content server system 100 has only just begun to provide content. It is appreciated that although for simplicity FIG. 1 depicts only two distinct countries, the content server system 100 could provide content to any number of different countries.

The client devices 110 may have an application 111 that allows interaction with the content server system 100. For example, the application 111 could be a browser that allows a user of the client device 110 to obtain content by browsing a web site of the content server system 100. As another example, the application 111 could be a dedicated application specifically designed (e.g., by the organization responsible for the content server system 100) to enable interactions with the content server system 100 and its content. The application 111 on a particular client device 110 may be associated with a user of the client device 110 (e.g., via a one-time registration, or a username and password pair or other credentials). When the application 111 is associated with a user, the application can store or otherwise gain access to the user's past listening history, demographic data about the user (either expressly provided by the user, or inferred based on factors such as listening history, geographic location, name, and the like).

Figure 2:
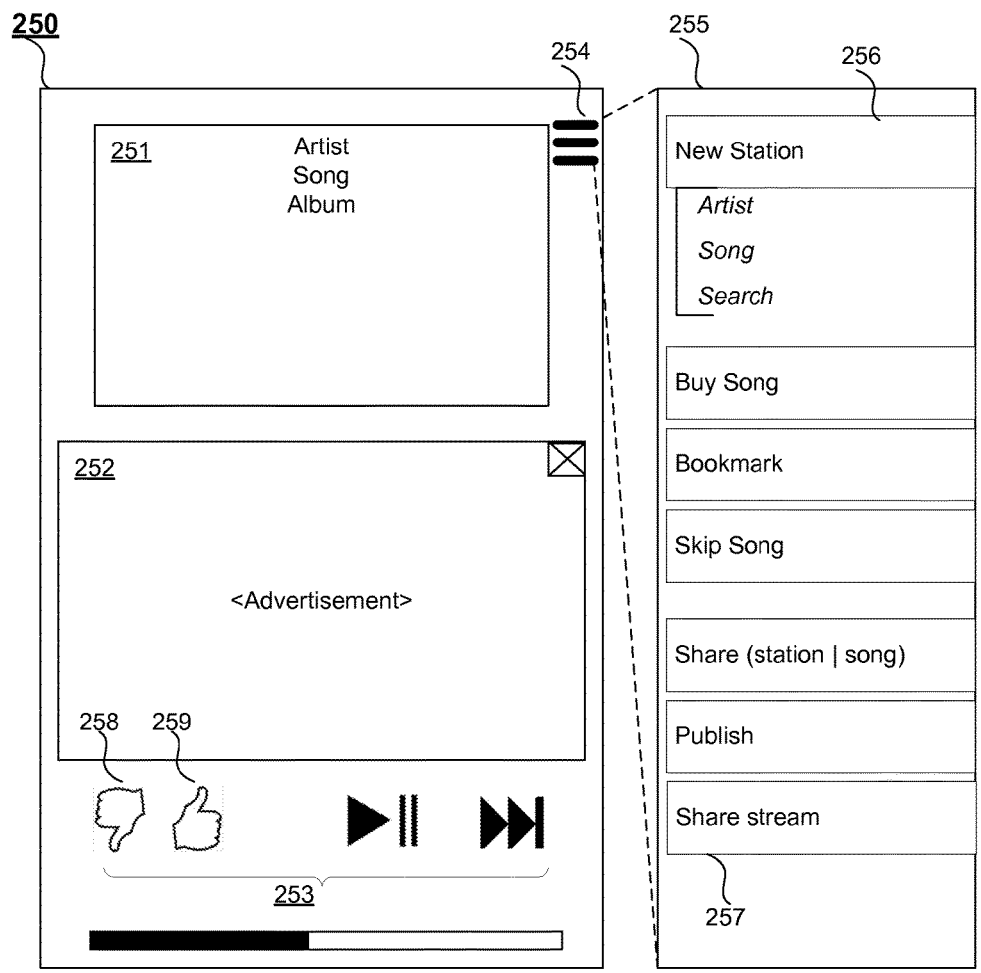
FIG. 2 illustrates a user interface for interacting with a stream of audio content objects, according to one embodiment.

In one embodiment, the application 111 includes a user interface 250 for interacting with a stream of song audio objects ("songs"), as illustrated in FIG. 2. The example user interface 250 includes a description area 251 providing information on a currently-playing song, an optional image advertisement 252, controls 253 for registering appreciation for (e.g., thumbs-up control 259), or dislike of (e.g., thumbs-down control 258), the song currently playing, and to pause/play or skip the current song. The example user interface 250 also includes a set of options 255 (shown in response to selection of popup control 254) that include an option 256 to request an audio stream that includes songs associated with a particular artist, song, or the like, and an option 257 to share a stream with other nearby users of the content server system 100 so that the other users can also (for example) react to the currently-playing song, such as registering appreciation for, or dislike of, the song, sharing the song, bookmarking the song, or the like.

Returning again to FIG. 1, in one embodiment a user uses the application 111 on the user's client device 110 to initiate a content playing session, e.g., simply by starting the application 111, or by some explicit action, such as selecting the "New Station" control 256 of the user interface of the application 111 and specifying a particular artist, song, or other criterion that will influence the content that is provided. The content server system 100 accordingly provides that particular instance of application 111 with a series of media content objects (e.g., streamed songs or other audio objects) that the content server system determines are most appropriate for the user. The series of media objects for a user is referred to herein as the "playlist" for that user.

Figure 3:
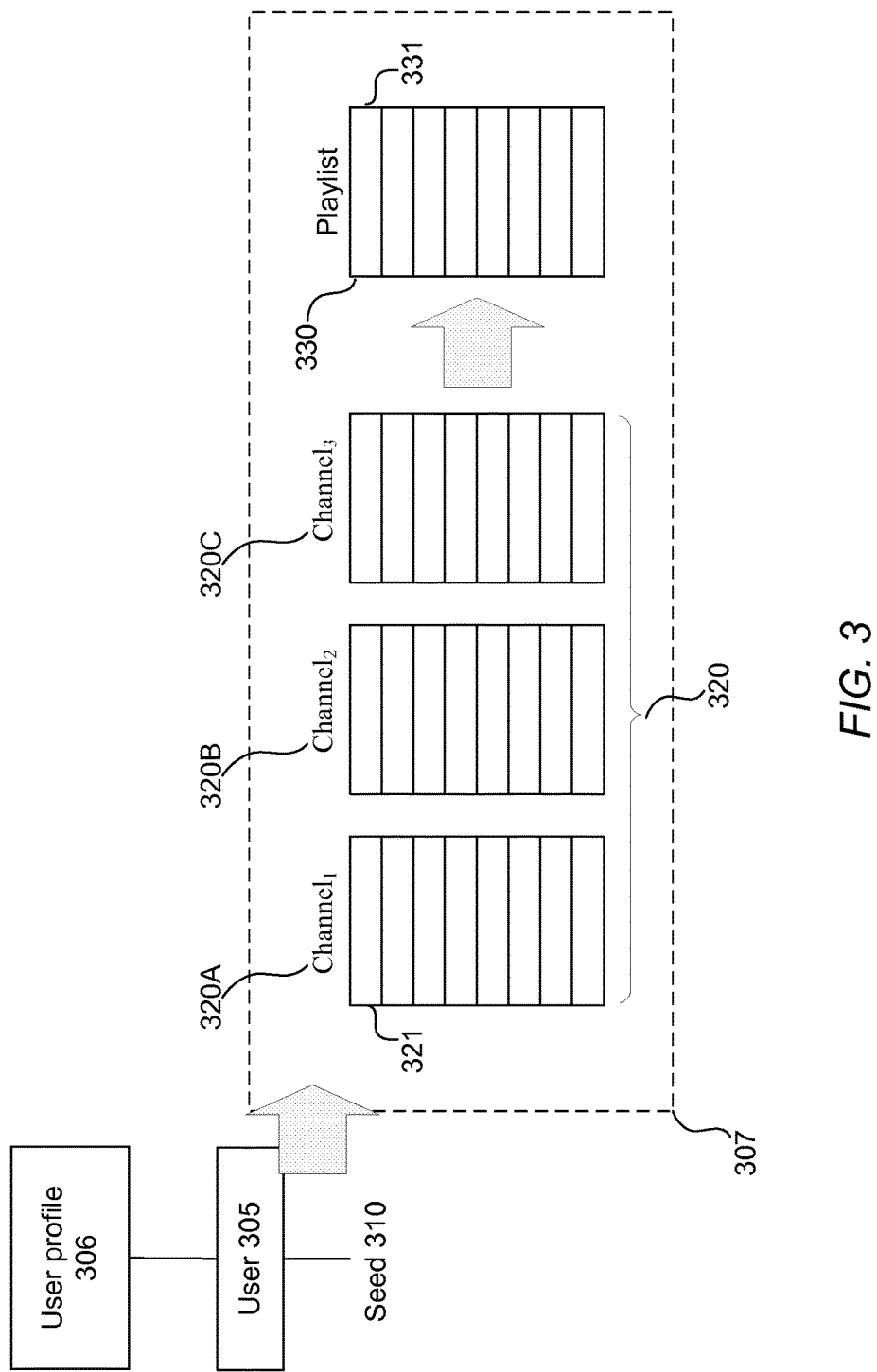
FIG. 3 is a data flow diagram illustrating the generation of a playlist, according to one embodiment.

FIG. 3 is a data flow diagram illustrating the generation of a playlist 330, according to one embodiment. In one embodiment, a content playing session 307 is initiated based on some criterion—such as a particular song, a particular artist, or a particular genre—that a user 305 specified when initiating that content playing session 307. For example, the playing session 307 may have been begun by the user using the control 256 of FIG. 2 to specify a particular song. Thereafter, this criterion—referred to hereinafter as a "media input seed", or simply "seed" 310—influences the selection of the media content objects that the content server system 100 provides to application 111 of that user. For example, if the seed 310 is a particular song, the content server system 100 would first play that particular song, and thereafter might play other songs by that same artist, other songs in the same genre, other songs with similar musical attributes, or the like. It is appreciated that the particular songs or other media content objects provided need not be completely determined by the seed. For example, the content server system 100 could sometimes provide a song that is generally popular among listeners as a whole, or a song that is newly-released, without reference to the particular seed 310 of the playing session 307.

Based at least in part on the context of the playing session—hereinafter referred to as the "play context"—the content server system 100 populates a number of "channels," 320 which are lists of unique identifiers of candidate media content objects according to corresponding criteria. (Examples of different possible channels are provided below with respect to FIGS. 4A-4D.) In one embodiment, the play context includes both the seed 310, and attributes of the user 305 as specified in a user profile 306 of the user 305.

Each unique media content object identifier 321 (for simplicity, hereinafter simply "media content object") may have additional associated data, such as a channel-specific score representing how important that particular media content object should be considered with respect to other media content objects on that same channel. The various channels 320 themselves may have corresponding weighting factors representing the relative importance of the channels. For example, a relatively high weighting factor may be assigned to a "highest ranking" channel 404 (reflecting that the user has explicitly expressed approval for the corresponding media content objects), and a lower weighting factor may be assigned to an "education level" channel 478 (reflecting that these media content objects generally tend to be approved by those of the user's education level, but unlike those on the "highest ranking" channel are not actually known to be approved by the user). The playlist 330 represents some combination of the candidate media content objects of the various channels 320, where the media content objects 331 on the playlist are obtained from one or more of the channels 320, and in one embodiment are ranked according to predicted suitability to the user 305. The ranking may be accomplished using the channel-specific scores (if any) of the media content objects, and/or the weighting factors (if any) of the channels, for example.

FIGS. 4A-4D illustrate sets of example channels 320 of media content objects, according to one embodiment. In brief, FIGS. 4A-4D respectively illustrate: a set of seed-related channels 402 that are influenced by the media input seed 310; a set of demographic channels 470 of media content objects that are influenced by user demographic information; a set of generic channels 442 that are influenced neither by the media input seed nor by user demographic information; and a set of country channels 497 that are influenced by the country of the user (e.g., the user's country of residence). It is appreciated that the particular channels illustrated in FIGS. 4A-4D need not all be employed, and other channels not illustrated may be employed in other embodiments.

FIG. 4A provides examples of various seed-related channels 402 that are influenced by the media inputs seed 310 used to establish a playing session 307, such as a particular song, a particular artist, a particular genre, or the like. A seed in essence defines a particular context in which the user plays content, and (for example) may correspond to a particular mood that the user is in (e.g., a "New Age" genre seed defining music listened to in the evening), or a particular activity in which the user is engaging (e.g., a particular rock artist defining music listened to when exercising), at the time of content playing. Thus, the generation and tracking of the seed-related channels 402 allows the content server system 100 to better select media content objects to replicate a particular user context (e.g., mood or activity).

Referring to the specific example channels illustrated in FIG. 4A, the highest ranking channel 404 includes a listing of media content objects (e.g., songs) for which the user who provided the media input seed has expressly indicated approval (e.g., with the thumbs-up control 259 of FIG. 2) while listening to a playlist generated using that particular seed. The collaborative filtering channel 406 includes media content objects which users in general (not just the current user) have expressly indicated approval while listening to a playlist generated using that particular seed. The whitelist channel 408 includes media content objects having the same artist as the seed's artist (that is, if the seed was artist, the seed itself, or—if the seed was a media content object—the artist associated with that media content object). The genre channel 414 includes media content objects sharing the same genre as the seed (that is, if the seed was a genre, the genre itself, or—if the seed was a media content object—the genre associated with the media content object). The similar content channel 416 includes media content objects that have intrinsic content-based similarities with respect to the seed. For example, in embodiments in which the media content objects are songs, the similar content channel 416 reflects songs that, with respect to a media content object serving as the seed, have similar musicological attributes in their intrinsic audio content, such as pitch, beat, rhythm, frequency, etc.

In the example of FIG. 4A, song A 418, song B 420, and song C 422 are illustrated as being listed in the highest ranking channel 404. Each respective media content object (e.g., song A 418) of a respective channel has a channel-specific score for that channel, such as the scores 424, 426, 428 corresponding to songs 418, 420, 420 on channel 404. In some embodiments, all songs on a particular channel have an equal score (e.g., all songs on the genre channel 414 have the same score, since they all share the same genre); in other embodiments, the songs on a channel may have different channel-specific scores, reflecting how strongly they satisfy the criteria defining the channel. In some embodiments, a media content object (e.g., Song A 430/418) is included in numerous channels simultaneously, but the media content object has a separately calculated channel-specific score for each channel. For example, Song A's score 436 for the "Genre" channel is separate and distinct from Song A's score 424 for the "Highest Ranking" channel. In some embodiments, the information about the media content object's scores across various channels is stored together or correlated.

FIG. 4B provides examples of various demographic channels 470. The demographic channels 470 are based on various demographic information provided (or deduced) about the user 305 and correlated to other users having similar demographic information. For example, FIG. 4B, includes an age related channel 472 containing media content objects that are popular with users who have the same age as the current user (or are within some predetermined amount of time from the user's age), and a gender related channel 474 containing media content objects that are popular with users who have the same gender as the current user. Affluence and education level channels 476, 478 likewise contain media content objects that are popular with users sharing the current user's general level of affluence or of education, respectively.

FIG. 4C provides examples of various generic channels 442 that are not influenced by the media input seed 310. For instance, some example generic channels 442 are an editor's picks channel 444 containing media content objects manually selected by employees responsible for the content server system 100; a current channel 446 and a recent channel 448 including currently popular media content objects released within a first threshold amount of time in the past, and a second, longer threshold amount of time in the past; a "gold" channel 450 of media content objects that have maintained at least some threshold level of popularity over time; and a new release channel 454 of media content objects released within some short threshold amount of time in the past.

FIG. 4D provides examples of various country-specific channels 497 that are influenced by the country of the user 305, e.g., as currently listed in the user's profile. In one embodiment, the country is the country of residence of the user, although in other embodiments the country is the country of origin (e.g., of birth). For example, the United States channel 496A contains media content objects that have been found to be appropriate for users whose country is the United States; the Germany channel 496B contains media content objects that have been found to be appropriate for users whose country is the Germany; and so forth. In one embodiment, the country-specific channels 497 may include a channel for each country to which the content server system 100 has previously provided content and for which it has kept country-specific statistics. It is appreciated that the country-specific channels 497 generally represent a discrete geopolitical zone throughout which the content server system 100 may begin to provide content; in some embodiments, the granularity could be different than a country as a whole, such as a particular state, province, or other region within a country.

In one embodiment, the songs of each country-specific channel 497 are determined only based on the media content objects determined to be popular among users of the corresponding country; for example, the Germany channel 496B might contain the media content objects having (for example) the greatest totals of express approval as specified by the thumbs-up control 259 of FIG. 2, the greatest percentages of express approvals relative to the number of times that they were played, or the like, among users whose country is Germany.

In other embodiments, the country-specific channels 497 act as a combination of all the other channels (herein referred to as "non-country-specific channels"), such as the seed-related channels 402, demographic channels 470, and generic channels 442 of FIGS. 4A-4C. For channels including a mix of users from different countries, only the statistics for users from the country in question are used. For example, the collaborative filtering channel 406 used to determine the contents of the Germany channel 496B are based only on the opinions expressed by those whose country is Germany, and the age channel 472 reflects the observed preferences of those who share the age of the user and whose country is Germany.

Figure 5:
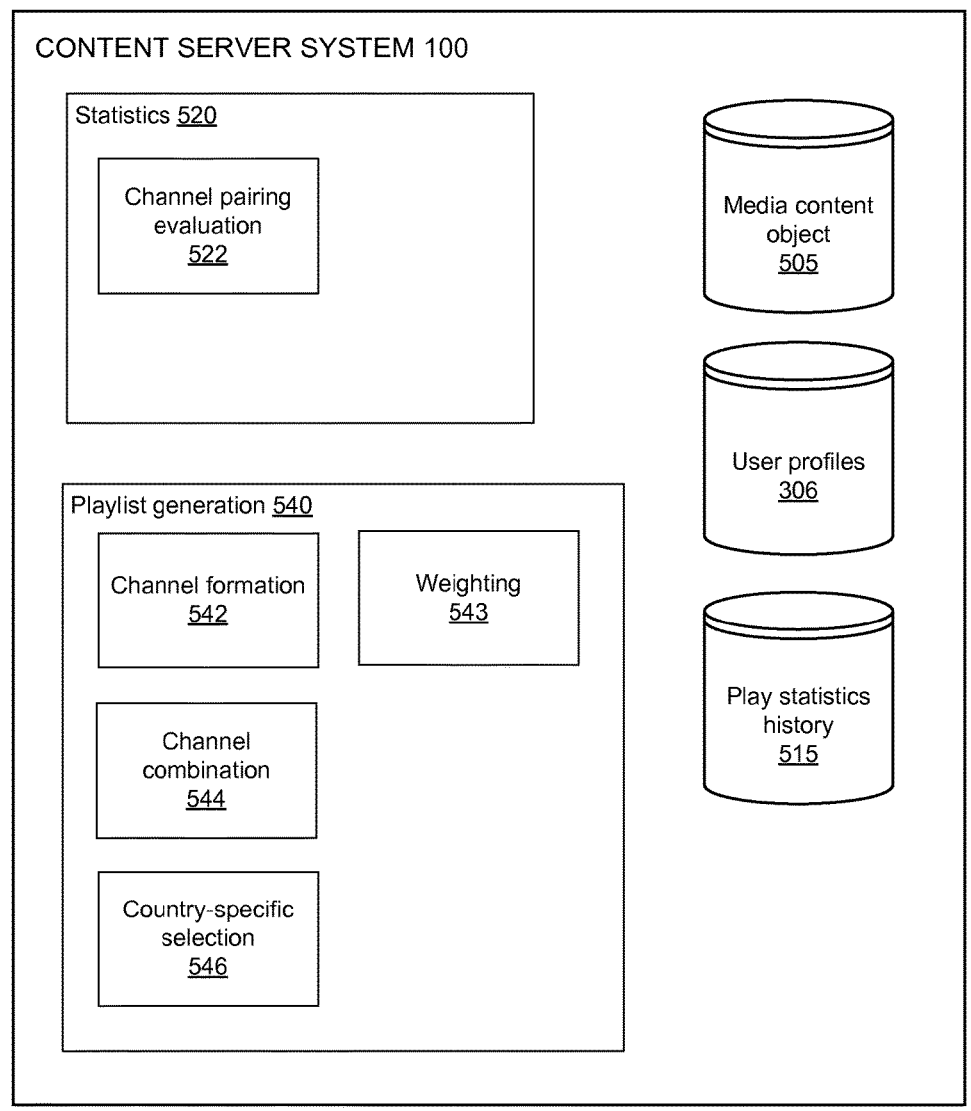
FIG. 5 is a high-level block diagram illustrating a detailed view of the content server system 100 of FIG. 1, according to one embodiment.

FIG. 5 is a high-level block diagram illustrating a detailed view of the content server system 100 of FIG. 1, according to one embodiment.

The content server system 100 includes a media content object repository 505 constituting a library of content (e.g., songs) that may be provided to users. Each media content object has associated metadata in addition to its intrinsic content, such as a unique identifier of the media content object, and any other information appropriate for the type of media content object. For example, in embodiments in which the media content objects are songs, the media content object repository 505 contains, in addition to the intrinsic audio data of the song, metadata such as (but not limited to) song artist, song title, song release date, song genre, song album, song primary language, song duration, and the like.

The content server system 100 also includes a set of user profiles 510, one for each identified user of the system. Each user profile contains data about the user to which it corresponds. For example, the user profile contains demographic information about the user, such as (but not limited to) user age, user gender, user country of residence, user primary language, highest level of education of the user, and approximate income level of the user, for example. In one embodiment, the demographic information is provided explicitly by the user. In other embodiments, the demographic information may be inferred in whole or in part. For example, the user's primary language could be inferred from the user's country of residence and the language of the songs to which the user most frequently listens.

The content server system 100 additionally includes a play statistics history 515 that is generated and managed by a statistics module 520. In one embodiment, for example, each time that the content server system 100 provides a media content object to a client 110, the statistics module 520 adds an entry specifying data about the providing of the media content object, such as: the unique identifier of the media content object; a unique identifier of the seed defining the content playing session 307 and playlist 330, such as the seed type and seed value (e.g., "song:a38qr92xt" where the seed is a song with unique identifier "a38qr92xt", "genre: newage" where the seed is the genre "New Age"); a unique identifier of the user to whom the media content was provided; and a time at which the media content object was provided. In one embodiment, the entry also includes data representing feedback obtained from the user after the media content object was provided, such as whether the user expressly indicated approval (or disapproval) of the media content object (e.g., via the controls 258-259, or the "skip track" control, of FIG. 2); whether the user shared the media content object; or the like. The feedback information can be analyzed to determine which songs are considered popular by users. The play statistics history 515 is used as input for generating the playlists for the various users.

In one embodiment, the statistics module 520 includes a channel pairing evaluation module 522 that empirically identifies pairs of channels that tend to produce particularly consistent user feedback results when taken together. Specifically, the channel pairing evaluation module 522 correlates user feedback about media content objects with the "recommendations" of pairs of channels. (In one embodiment, a channel is said to "recommend" a media content object if the media content object is present in the channel, and to not recommend a media content object if the media content object is not present in the channel.)

In one embodiment, the channel pairing evaluation module 522 identifies different channel pairs, and further determines, for each of the four possible recommendation pairs (i.e., both channels recommend, neither channel recommends, first channel recommends but second channel does not recommend, and first channel does not recommend but second channel does recommend), a measure of how appropriate the corresponding media content object was for the user. For example, it might be determined that when both the "collaborative filtering" channel 406 and the "similar content" channel 416 recommend a particular media content object, the media object tends to be very appropriate for the user.

The content server system 100 additionally includes a playlist generation module 540 that generates the playlist corresponding to the current play context, such as the pairing of the particular user for whom the playlist is being generated with a particular seed also influencing the playlist generation.

The playlist generation module 540 includes a channel formation module 542 that selects the media content objects for each of the channels, such as the various non-country-specific channels of the embodiment illustrated in FIGS. 4A-4C. A channel and its media content objects may be thought of as recommendations for the user according to the criteria that define the channel. The contents of each channel are formed by identifying media content objects appropriate for the channel, given the particular play context. For example, in one embodiment the media content objects to be included in the highest ranking channel 404 are selected by identifying the media content objects for which the current user has most strongly indicated appreciation according to some metric when the seed was the same as the current seed. In one embodiment, the approval metric is based on a combination of express indications of appreciation, number of times the media content object has been played for that user, and the like.

The playlist generation module 540 includes a channel combination module 544 that combines the recommendations of the various media content objects defined by the various channels to obtain combination scores for the media content objects. The exact manner of combination may be accomplished differently in different embodiments. In some embodiments, the combination score is calculated by combining the respective media content object's channel specific score for each of at least two of the plurality of channels. It is noted that in some implementations channels are scored such that a media content object's channel specific score on a first channel is the first channel's score. In some implementations, the combination score is calculated in real time or the fly in response to a request for a media content object. In other implementations the combination score is pre-calculated (e.g., it is calculated overnight or during other nonpeak usage times.) In some embodiments, when the combination scores is pre-calculated, the weighting is performed in real time or on the fly in response to a media content object request. In some embodiments, the combination score is based at least in part on the respective media content object's channel specific score for two channels that it is on (e.g., it is a weighted summation). In some embodiments, the combination score is based at least in part on the respective media content object's channel specific score for three to five channels that it is on (i.e., three to five channels are mixed). In other embodiments, the combination score is a combination of each channel that the respective media content object is on. In still other embodiments, the combination score is based at least in part on the respective media content object's channel specific score for all or at least a majority of the obtained plurality of channels. In some embodiments, if the object is not listed on one or more of the obtained plurality of channels, that channel is ignored for the purposes of obtaining the respective media content object's combination score. In other embodiments, the media content object is given a default score on any channel where it is not listed.

In one embodiment, the playlist generation module 540 forms the playlist 330 by sorting the media content objects m according to their overall scores, with greater overall scores being placed higher in the playlist. In one embodiment, the generated playlist 330 may additionally be altered according to other selection rules, such as not playing songs from the same genre within some threshold amount of time of each other.

In one embodiment, the playlist generation module 540 uses a weighting module 543 to determine the weighting factors for the different channels and media content objects. For example, the weighting factors for the various channels may be set to predetermined values reflecting the relative importance of the channels, such as a high weighting value for the "highest ranking" channel 404, and a low weighting value for the "new release" channel 454. In one embodiment, the weighting factors for the media content objects are calculated according to a combination of (1) interactions of the user with the media content objects that indicate the degree of the user's appreciation of the media content objects (e.g., interactions expressly indicating appreciation or dislike), and (2) correspondences between the media content objects and the user's profile 510 (e.g., a match between the genre of the media content object and a genre that the user profile indicates is approved by the user).

In one embodiment, the playlist generation module 540 uses the observations of the channel pairing evaluation module 522 to further adjust the overall scores of the different media content objects. Specifically, the playlist generation module 540 determines whether any of the channel pairs for the current context are producing recommendations corresponding to any of the recommendation pairs determined by the channel pairing evaluation module 522 to be most predictive. For instance, continuing the prior example, if the playlist generation module 540 determined that the "collaborative filtering" channel 406 and the "similar content" channel 416 were both recommending a particular media content object, the playlist generation module 540 could significantly increase the overall score of that media content object (as determined by Eq. 1, above, for example), since that particular recommendation pair was previously empirically determined to produce particularly favorable results.

The playlist generation module 540 additionally employs a country-specific selection module 546 that derives a country-specific playlist that is targeted to the country of the current user. Since the content server system 100 may lack a large volume of country-specific statistics for countries to which the content server system 100 has only recently begun to provide content, in one embodiment the country-specific selection module 546 addresses the relative lack of country-specific data by combining recommendations based on country-specific data with recommendations based on non-country-specific data. For example, the non-country-specific playlist generated by the channel formation module 542 and the channel combination module 544 using non-country-specific statistics represents non-country-specific recommendations, and the country-specific channels 497 represent country-specific recommendations.

In one embodiment, the country-specific selection module 546 computes a blending factor for combining the non-country-specific recommendations with the country-specific recommendations. The blending factor represents the relative reliability of the country-specific recommendations, and may be computed as (for example) a function of the number of statistics specific to the country in question, or of an amount of time that the content server system 100 has been providing content to that country. The higher the blending factor, the more strongly the appropriate country-specific channel 497 influences the country-specific playlist; the lower the blending factor, the more strongly the non-country-specific playlist 330 influences the country-specific playlist.

In one embodiment, the blending factor is a number (e.g., a real number in the range [0, 1], or an equivalent range of integer values) used to compute a linear combination of the country-specific recommendations and the non-country-specific recommendations. For example, if the country-specific channels 497 have associated numerical scores calculated in the same manner as those of the non-country-specific playlist 330, then the country-specific score for a media content object m could be calculated as follows:

$$\text{score\_country}(m) = (\text{score overall}(m))*(1\text{-blending factor}) + (\text{score\_country channel}(m))*\text{blending factor}$$

where score_country_overall(m) is the score for m for the country in question; score overall(m) is non-country-specific score calculated by (for example) Eq. 1, above; score_country_channel(m) is the score produced for m by the country channel 497 for the appropriate country; and blending factor is a real number in [0, 1]. The country-specific selection module 546 then ranks the different media content objects m by their country-specific score values, with media content objects with higher country-specific score values being placed higher within the country-specific playlist.

In one embodiment, blending_factor is set to 0 if there is less than some predetermined minimum amount of country-specific statistics (resulting in the non-country-specific playlist 330 being used as-is), and to 1 if there is more than some predetermined maximum amount of country-specific statistics (resulting in the country-specific channel 497 for the country in question being used as-is), and otherwise to some value between 0 and 1 that reflects the extent to which country-specific statistics are available for the country in question.

In another embodiment, the country-specific selection module 546 generates the country-specific playlist by selecting some number of media content objects from the non-country-specific playlist 330, and some other number from the appropriate country-specific channel 497, where the numbers are determined based on the blending factor. For example, for a blending factor of 0.9 (on a scale of 0 to 1), indicating strong reliability of the appropriate country-specific channel 497, 90% of the country-specific playlist could be composed of top media content objects in the appropriate country-specific channel 497, with the remaining 10% composed of top media content objects from the non-country-specific playlist 330.

In another embodiment, when generating a country-specific playlist for a target country, the country-specific selection module 546 identifies another country with more statistics as being similar, and uses statistics for the similar country instead of, or in addition to, the statistics for the target country. For example, the country-specific playlist for the similar country could be substituted for that of the target country. Alternatively, statistics for both the target country and the similar country could be used to generate the country-specific channel 497 for the target country, rather than relying solely on the (sparse) statistics for the target country.

As a specific example, if the content server system 100 had been providing content to Germany for a considerable period of time, but had just begun to provide content to Austria, the country-specific selection module 546 might select Germany as being a country similar to Austria (due, e.g., to its similarity in national language and geographic location). Then, when generating the country-specific playlist for Austria (e.g., for a user located in Austria), the country-specific selection module 546 could either use the country-specific playlist for Germany or combine statistics from Germany with those from Austria when generating the country-specific channel 497 for Austria. If the combined statistics from both Germany and Austria were not sufficiently large, then the country-specific selection module 546 could further combine the country-specific channel 497 for Austria with the non-country-specific playlist, using a blending factor reflecting the amount of combined statistics for Austria and Germany.

Figure 6:
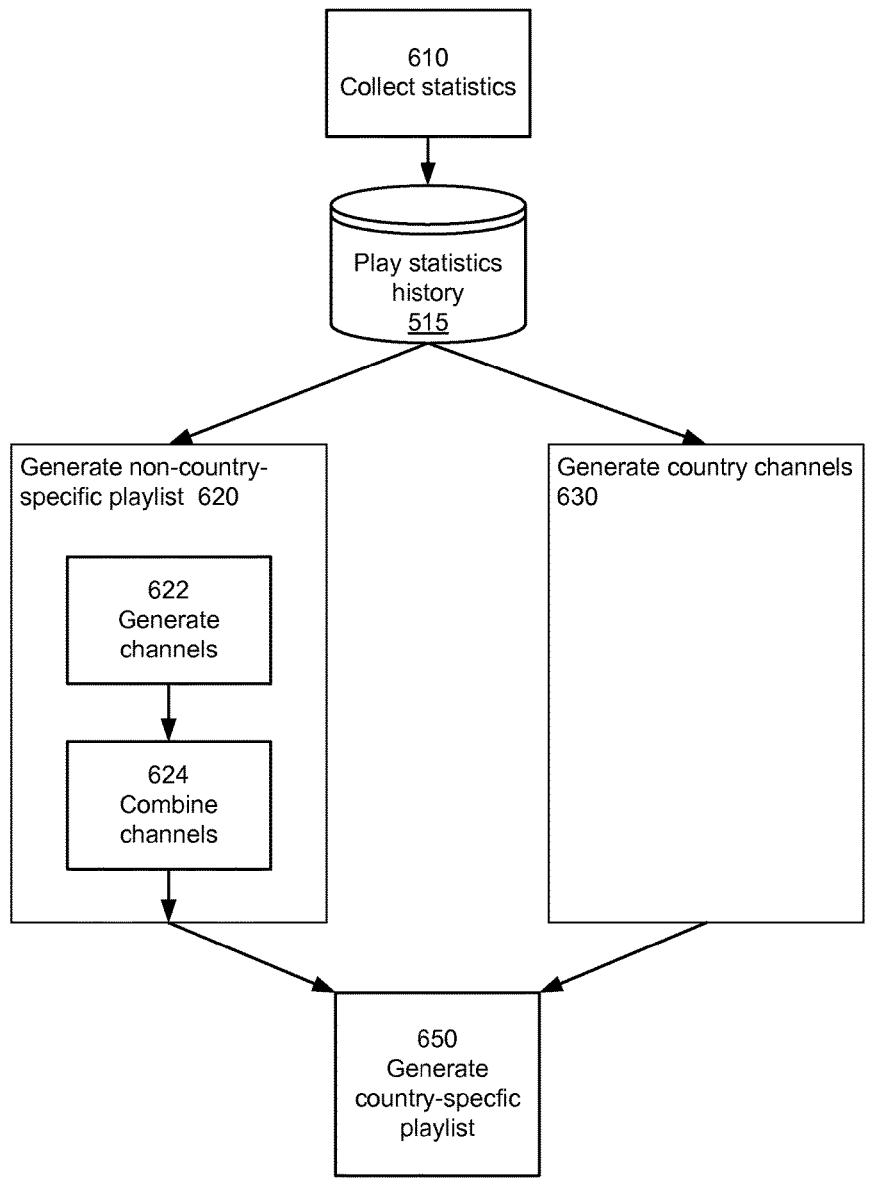
FIG. 6 is a flowchart that illustrates operations involved in the generation of a country-specific playlist, according to one embodiment.

FIG. 6 is a flowchart that illustrates operations involved in the generation of a country-specific playlist for a target country, according to one embodiment.

The content server system 100 collects 610 statistics on the provision of media content items to users, and any feedback obtained from the users, as discussed above with respect to the statistics module 520 of FIG. 5. The collected statistics may involve users with many different country attributes, and are stored in the play statistics history 515.

The content server system 100 generates 620 a non-country-specific playlist based on statistics from the play statistics history 515 that are not specific to any particular country. That is, the statistics used when deriving the non-country-specific playlist may be obtained from users in any country, and not just the country for which a country-specific playlist is to be generated. In one embodiment, the generation of the non-country-specific playlist comprises generation 622 of a set of non-country-specific channels (e.g., the example channels of FIGS. 4A-4C), and the combination 624 of those channels, as described above in more detail with respect to the channel formation module 542 and channel combination module 544.

The content server system 100 also generates 630 a country channel for the target country, as discussed above with respect to the channel formation module 542 and FIG. 4D.

The content server system 100 generates a country-specific playlist for the target country by combining the non-country specific playlist and the country channel for the target country, as discussed above with respect to the country-specific selection module 546. For example, a blending factor representing the relative reliability of the country-specific recommendations (measured as, e.g., the amount of country-specific statistics available) may be used to effect the combination.

Figure 7:
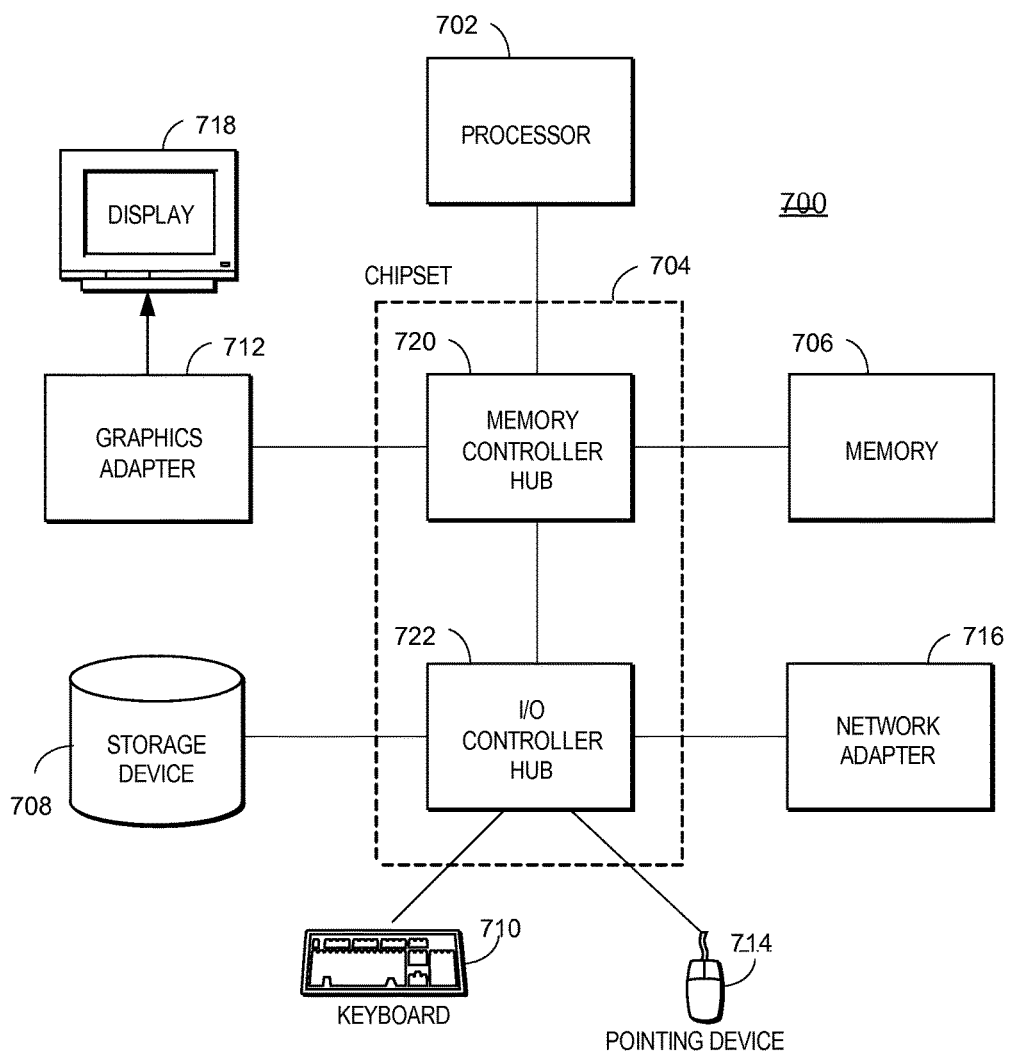
FIG. 7 is a high-level block diagram illustrating physical components of a computer used as part or all of the content server system or client device from FIG. 1, according to one embodiment.

FIG. 7 is a high-level block diagram illustrating physical components of a computer 700 used as part or all of the content server system 100 or client device 110 from FIG. 1, according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718; similarly, a computer 700 acting as a smartphone may lack a keyboard 710 or external pointing device 714, for example. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method, comprising:
identifying a client device of a user, the client device receiving streamed media content objects and associated with a first country;
identifying an input seed associated with the client device;
generating a non-country-specific playlist of media content objects based on the user and on the input seed;
generating a country-specific channel corresponding to the first country, the country-specific channel comprising media content objects;
determining whether a number of statistics stored for the first country is greater than a minimum threshold value and less than a maximum threshold value, the statistics corresponding to media content objects that have been provided to client devices;
responsive to the number of statistics stored for the first country being greater than the minimum threshold value and less than the maximum threshold value:
computing a blending factor for combining the non-country-specific playlist of media content objects with the country-specific channel, wherein the blending factor is a real number that is based on the number of statistics stored for the first country;
responsive to the number of statistics stored for the first country being less than the minimum threshold value:
computing a blending factor for combining the non-country-specific playlist of media content objects with the country-specific channel, wherein the blending factor is substantially zero;
responsive to the number of statistics stored for the first country being greater than the maximum threshold value:
computing a blending factor for combining the non-country-specific playlist of media content objects with the country-specific channel, wherein the blending factor is substantially one;
generating a country-specific playlist of media content objects by combining the non-country-specific playlist with the country-specific channel such that an amount of media content objects in the country-specific playlist that are selected from the country-specific channel is proportional to the blending factor, the generating comprising computing a country-specific score as a linear combination of a country-specific recommendation and a non-country-specific recommendation; and selecting a media content object from the country-specific playlist for transmission to the client device.

2. The computer-implemented method of claim 1, wherein generating the country-specific channel comprises:

identifying a second country as being similar to the country of the user; and using content statistics associated with the second country to generate the country-specific channel.

3. The computer-implemented method of claim 1, wherein generating the non-country-specific playlist comprises:

generating a plurality of non-country-specific channels specifying media content objects, at least one of the non-country-specific channels being based on the input seed; and combining the non-country-specific channels.

4. The computer-implemented method of claim 3, wherein the non-country-specific channels have corresponding weighting factors, a weighting factor being representative of a relative importance of a channel compared to other channels, the method further comprising:

generating channel-specific scores for the media content objects on the non-country-specific channels using the weighting factors of the non-country-specific channels, and selecting media content objects from the non-country-specific channels to add to the country-specific playlist based on the channel-specific scores.

5. The computer-implemented method of claim 3, wherein the media content objects have channel-specific scores on the country-specific channel, the method further comprising:

generating channel-specific scores for the media content objects, and selecting media content objects from the country-specific channel to add to the country-specific playlist based on the channel-specific scores.

6. The computer-implemented method of claim 3, further comprising:

identifying a recommendation pair comprising a first non-country-specific channel and a second non-country-specific channel, wherein the first non-country-specific channel and the second non-country-specific channel produce consistent user feedback;

determining that the first non-country-specific channel includes a media content object;

determining that the second non-country-specific channel includes the media content object;

adjusting an overall score for the media content object based on the user feedback produced for the recommendation pair; and ranking the media content object in the country specific playlist using the adjusted overall score of the media content object.

7. A non-transitory computer-readable storage medium comprising computer program instructions executable by a processor, the instructions comprising:

instructions for identifying a client device of a user, the client device receiving streamed media content objects and associated with a first country;

instructions for identifying an input seed associated with the client device;

instructions for generating a non-country-specific playlist of media content objects based on the user and on the input seed;

instructions for generating a country-specific channel corresponding to the first country, the country-specific channel comprising media content objects;

instructions for determining whether a number of statistics stored for the first country is greater than a minimum threshold value and less than a maximum threshold value the statistics corresponding to media content objects that have been provided to client devices;

instructions for, responsive to the number of statistics stored for the first country being greater than the minimum threshold value and less than the maximum threshold value:

computing a blending factor for combining the non-country-specific playlist of media content objects with the country-specific channel, wherein the blending factor is a real number that is based on the number of statistics stored for the first country;

instructions for, responsive to the number of statistics stored for the first country being less than the minimum threshold value:

computing a blending factor for combining the non-country-specific playlist of media content objects with the country-specific channel, wherein the blending factor is substantially zero;

instructions for, responsive to the number of statistics stored for the first country being greater than the maximum threshold value:

computing a blending factor for combining the non-country-specific playlist of media content objects with the country-specific channel, wherein the blending factor is substantially one;

instructions for generating a country-specific playlist of media content objects by combining the non-country-specific playlist with the country-specific channel such that an amount of media content objects in the country-specific playlist that are selected from the country-specific channel is proportional to the blending factor, the generating comprising computing a country-specific score as a linear combination of a country-specific recommendation and a non-country-specific recommendation; and instructions for selecting a media content object from the country-specific playlist for transmission to the client device.

8. The non-transitory computer-readable storage medium of claim 7, wherein generating the country-specific channel comprises:

identifying a second country as being similar to the country of the user; and using content statistics associated with the second country to generate the country-specific channel.

9. The non-transitory computer-readable storage medium of claim 7, wherein generating the non-country-specific playlist comprises:

generating a plurality of non-country-specific channels specifying media content objects, at least one of the non-country-specific channels being based on the input seed; and combining the non-country-specific channels.

10. The non-transitory computer-readable storage medium of claim 9, wherein the non-country-specific channels have corresponding weighting factors, a weighting factor being representative of a relative importance of a channel compared to other channels, the instructions further comprising:
- instructions for generating channel-specific scores for the media content objects on the non-country-specific channels using the weighting factors of the non-country-specific channels, and
- instructions for selecting media content objects from the non-country-specific channels to add to the country-specific playlist based on the channel-specific scores.

11. The non-transitory computer-readable storage medium of claim 9, wherein the media content objects have channel-specific scores on the country-specific channels, the instructions further comprising:
- instructions for generating channel-specific scores for the media content objects; and
- instructions for selecting media content objects from the country-specific channel to add to the country-specific playlist based on the channel-specific scores.

12. The non-transitory computer-readable storage medium of claim 9, the instructions further comprising:
- instructions for identifying a recommendation pair comprising a first non-country-specific channel and a second non-country-specific channel, wherein the first non-country-specific channel and the second non-country-specific channel produce consistent user feedback;
- instructions for determining that the first non-country-specific channel includes a media content object;
- instructions for determining that the second non-country-specific channel includes the media content object;
- instructions for adjusting an overall score for the media content object based on the user feedback produced for the recommendation pair; and
- instructions for ranking the media content object in the country specific playlist using the adjusted overall score of the media content object.

13. A computer system comprising:
a processor; and
computer program instructions executable by the processor, the instructions comprising:
- instructions for identifying a client device of a user, the client device receiving streamed media content objects and associated with a first country;
- instructions for identifying an input seed associated with the client device;
- generating a non-country-specific playlist of media content objects based on the user and on the input seed;
- instructions for generating a country-specific channel corresponding to the first country, the country-specific channel comprising media content objects;
- instructions for determining whether a number of statistics stored for the first country is greater than a minimum threshold value and less than a maximum threshold value, the statistics corresponding to media content objects that have been provided to client devices;
- instructions for, responsive to the number of statistics stored for the first country being greater than the minimum threshold value and less than the maximum threshold value:
  - computing a blending factor for combining the non-country-specific playlist of media content objects with the country-specific channel, wherein the blending factor is a real number based on the number of statistics stored for the first country;
- instructions for, responsive to the number of statistics stored for the first country being less than the minimum threshold value:
  - computing a blending factor for combining the non-country-specific playlist of media content objects with the country-specific channel, wherein the blending factor is substantially zero;
- instructions for, responsive to the number of statistics stored for the first country being greater than the maximum threshold value:
  - computing a blending factor for combining the non-country-specific playlist of media content objects with the country-specific channel, wherein the blending factor is substantially one;
- instructions for generating a country-specific playlist of media content objects by combining the non-country-specific playlist with the country-specific channel such that an amount of media content objects in the country-specific playlist that are selected from the country-specific channel is proportional to the blending factor, the generating comprising computing a country-specific score as a linear combination of a country-specific recommendation and a non-country-specific recommendation; and
- instructions for selecting a media content object from the country-specific playlist for transmission to the client device.

14. The computer system of claim 13, wherein generating the country-specific channel comprises:
- identifying a second country as being similar to the country of the user; and
- using content statistics associated with the second country to generate the country-specific channel.

15. The computer system of claim 13, wherein generating the non-country-specific playlist comprises:
- generating a plurality of non-country-specific channels specifying media content objects, at least one of the non-country-specific channels being based on the input seed; and
- combining the non-country-specific channels.

16. The computer system of claim 15, wherein the media content objects have channel-specific scores on the country-specific channels, the instructions further comprising:
- instructions for generating channel-specific scores for media content objects; and
- instructions for selecting media content objects from the country-specific channel to add to the country specific playlist based on the channel-specific scores.

17. The computer system of claim 15, the instructions further comprising:
- instructions for identifying a recommendation pair comprising a first non-country-specific channel and a second non-country-specific channel, wherein the first non-country-specific channel and the second non-country-specific channel produce consistent user feedback;
- instructions for determining that the first non-country-specific channel includes a media content object;
- instructions for determining that the second non-country-specific channel includes the media content object;
- instructions for adjusting an overall score for the media content object based on the user feedback produced for the recommendation pair; and
- instructions for ranking the media content object in the country specific playlist using the adjusted overall score of the media content object.

* * * * *